United States Patent Office 3,600,453
Patented Aug. 17, 1971

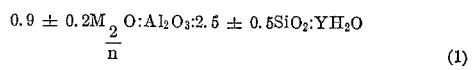

3,600,453
OLEFIN CLASSIFICATION PROCESS
Paul H. Reichenbacher, Elk Grove Village, and Armand J. de Rosset, Clarendon Hills, Ill., assignors to Universal Oil Products Company, Des Plaines, Ill.
No Drawing. Filed Mar. 5, 1969, Ser. No. 804,684
Int. Cl. C10g 43/08
U.S. Cl. 260—677
6 Claims

ABSTRACT OF THE DISCLOSURE

A stream containing at least one hydrocarbon isomer selected from the organic compounds having double bonds in cis and trans geometric configurations is contacted with a crystalline aluminosilicate adsorbent to effect adsorption of at least one geometric isomer by the adsorbent. A desorbent stream is then contacted with the crystalline aluminosilicate adsorbent to displace the adsorbed geometric isomer and a stream comprising desorbent and at least one geometric isomer is recovered.

BACKGROUND OF THE INVENTION

The field of the art to which this invention pertains is hydrocarbon separation. More particularly, this invention relates to an adsorptive-separation process which concentrates geometric isomers according to respective cis nad trans configurations.

SUMMARY OF THE INVENTION

It is an object of this invention to separate at least one cis or trans isomer from a hydrocarbon feed stream. It is another and more specific object of this invention to provide a process for the separation of cis and trans geometric isomers from a hydrocarbon feed stream and to recover at least one stream enriched in the cis geometric isomer or the trans geometric isomer. These and other objects of this invention will become apparent in view of the remaining specification which follows.

The adsorbents which can be used in the process of this invention include the type X and Y crystalline aluminosilicate zeolites in naturally-occurring or synthetically-prepared forms containing exchangeable cations selected from the group of copper, silver, gold, zinc, cadmium and mercury. Reference can be made to United States Patents Numbers 2,882,243 and 3,130,007 for the composition and method of manufacture of the type X and type Y crystalline aluminosilicates. The methods of manufacturing the above-mentioned zeolites is not necessarily limited to the methods taught in these patents, but are to be taken as particular examples illustrating, in a detailed manner, a method by which the adsorbent base used in the process of this invention can be produced.

In producing the finished adsorbent, cationic or base-exchange methods may be used to obtain an adsorbent product containing the required cation or cations located within the cage structure of the crystalline aluminosilicate zeolite. Cationic exchange methods as generally known to those familiar with the field of crystalline aluminosilicate production and are generally performed by contacting a zeolite with an aqueous solution of a soluble salt of the cation or cations desired to be exchanged on the sieves. The degree of cation exchange is allowed to take place before the sieves are removed from the aqueous solution and dried to a desired water content.

As is known in the art, the type X crystalline aluminosilicate zeolite has an approximate chemical composition of a unit crystal cell as shown in Equation 1 below:

$$0.9 \pm 0.2 \frac{M}{n}_2 O : Al_2O_3 : 2.5 \pm 0.5 SiO_2 : Y H_2O \quad (1)$$

wherein M represents at least one cation having a valence of not more than three, $n$ represents the valence of M and Y may be any value up to about 8, the atoms of the zeolite being arranged in a unit cell in an orderly crystalline manner. The type Y zeolite has the same crystal structure as the type X but has a different chemical composition. The $SiO_2/Al_2O_3$ ratio for the type Y zeolite is higher than the $SiO_2/Al_2O_3$ ratio for the type X zeolite which results in a corresponding reduction in exchangeable cationic sites in the type Y zeolite. The cations present at the exchangeable cationic sites generally comprise sodium and calcium for the originally produced synthetic base and for use in the process of this invention are substantially replaced by the cations from the Group I-B and II-B metals of the Periodic Table of the Elements.

The adsorbents which can be used in the process of this invention include the type X and type Y crystalline aluminosilicates which have had a portion of their exchangeable cationic sites replaced by other metallic cations. The type X and Y zeolites are about equal in their ability to separate the cis and trans geometric isomers.

The process of this invention may be operated in either liquid or vapor phase at a temperature included within the range of from about 30° F. to about 200° F. and at a pressure included within the range of from about atmospheric to about 1000 p.s.i.g.

In attempting to separate cis and trans geometric isomers having a large variance in molecular weights, in some instances the lower molecular weight (shorter chain length) isomers are more tenaciously held on the adsorbent than either the longer chain length cis and trans isomers. This condition hinders effective cis-trans separation. In order to overcome this problem, it is preferable when incorporating feed stock having both cis and trans geometric isomers of differing chain lengths to limit the range of the feed stock to a given carbon number range preferably within the range of from about 2 to about 4 carbon atoms. This can generally be accomplished by pre-fractionation of the feed stream. The location of the olefinic bond within the cis and trans isomers does not appear to substantially affect the cis-trans separation.

Feed stocks which can be used in the process of this invention can contain cis and trans geometric isomers included within the range of from about 6 to about 18 carbon atoms per molecule. Particular feed stock materials which can be used in the process of this invention include functional hydrocarbons containing double bonds in cis and trans isomeric configurations. Examples of feed stocks which can be used in addition to olefinic hydrocarbons are compounds such as the alcohols, esters, ethers, halogen derivatives, ketones, aldehydes, etc. Diluents including normal, iso- and monocyclic paraffins, monocyclic aromatics and substituted aromatic compounds can also be present in the feed.

In selecting a desorbent, the primary considerations include ease of separation of the desorbent and the desorbed feed material, and the tenacity of the adsorbent for the desorbent as compared to the feed stock component being adsorbed. Separation of the desorbent and the selectively adsorbed component of the feed stock is generally accomplished by fractionation which requires a reasonable difference in the boiling points of the selectively adsorbed feed component and the desorbent material. In cases where the desorbent is much more tenaciously held by the adsorbent that the selectively adsorbed component of the feed, the initial desorption of the selectively adsorbed component of the feed from the adsorbent presents no difficulty, but when the adsorbent, which now contains adsorbed desorbent, is contacted once again with feed material (after being contacted with a desorbent stream) the feed stock can not replace the tightly held desorbent which is presently contained within the adsorbent and there is little, if any, adsorption of any of the feed components by the adsorbent. In cases where the feed is much more tenaciously held on the adsorbent than the desorbent material, the feed can be removed only by mass action effects of a large amount of desorbent contacting the adsorbent. This is generally a slow operation and is to be avoided if possible.

Desorbent materials which can be used in this process include normal, iso- and monocyclic paraffins, ethers, alcohols, esters, aldehydes, etc., all of which are easily separatable from the selectively adsorbed feed components and can be re-used in this process.

In separating cis and trans isomers by using a two step desorption operation, the desorbent composition can be changed during desorption operations to effect desorption of the more strongly held cis isomers after the relatively less strongly held trans isomers have been desorbed. A gradual increase in the concentration of a polar component of the desorbent material can be used to selectively desorb the trans isomer followed by desorption of the cis isomer.

Example I

The adsorbent used in this example was a type Y zeolite which was essentially totally exchanged with silver ions. The sieves were 20–40 mesh in size and contained about 31.3 wt. percent silver (calculated as the element) on a volatile-free basis. The volatile-free basis for quantitatively determining the silver content was measured by subjecting the sieves to an air purge drying step in an oven for about 2½ hours, and about 500° C. and then quantitatively determining the silver content of the essentially dried sieves.

The sieves were then loaded into an adsorbent chamber which was cylindrical in nature having inlet and outlet pores at the opposite ends of the chamber. The outlet pore of the adsorbent chamber was connected to an outlet line which was arranged in such a manner so that the effluent leaving the adsorbent chamber could be collected in separate 15 cc. volume fractions for analysis.

The separation experiments were carried out at atmospheric pressure and at ambient temperatures which allowed liquid phase operations to take place. The procedures followed during the operation of this example consisted essentially of an adsorption step followed by a desorption step. A feed mixture containing cis and trans olefinic geometric isomers was first passed through a bed of adsorbent contained in the adsorption zone. Some of the feed mixture was allowed to be adsorbed on the sieves generally loading them to their maximum capacity. After the sieves were loaded with the feed mixture, the material present in the interstitial voids between the individual particles of adsorbent was drained leaving essentially adsorbed liquid feed present in the adsorbent. A desorbent was then passed through the adsorption chamber. The effluent material passing out of the adsorbent chamber contained desorbent and desorbed feed material. The effluent material was collected in 15 cc. volume fractions and individually analyzed to determine the type of material initially desorbed from the adsorbent and the type of material held most tenaciously by the silver-exchanged type Y zeolite.

A feed mixture containing a mixture of cis- and trans- 3-heptenes was passed through the adsorbent chamber until the adsorbent contained therein was fully loaded with both the cis- and trans- 3-heptene geometric isomers. The excess feed stock was drained from the adsorbent and a desorbent stream was passed through the adsorbent chamber. The desorbent material initially charged to the adsorbent chamber was pure pentane. Gradual additions of ethyl ether were made to the desorbent stream while passing the desorbent through the adsorbent chamber. Table I below shows the separate elution effects for trans- and cis- 3-heptene separation.

TABLE I

| Effluent fraction No.[1] | Volumetric ratio of pentane/ether present in the desorbent | Olefin present in effluent |
|---|---|---|
| 1 | 100/0 | None. |
| 2 | 100/0 | Do. |
| 3 | 100/0 | Do. |
| 4 | 100/0 | Do. |
| 5 | 100/0 | Do. |
| 6 | 100/0 | Do. |
| 7 | 100/0 | Do. |
| 8 | 98/2 | Do. |
| 9 | 98/2 | Do. |
| 10 | 98/2 | Do. |
| 11 | 98/2 | Do. |
| 12 | 94/6 | Do. |
| 13 | 94/6 | Do. |
| 14 | 94/6 | Do. |
| 15 | 94/6 | Do. |
| 16 | 80/20 | Do. |
| 17 | 80/20 | Do. |
| 18 | 80/20 | Trans-3-heptene. |
| 19 | 50/50 | Do. |
| 20 | 50/50 | Do. |
| 21 | 50/50 | Do. |
| 22 | 0 | Do. |
| 23 | 0 | None. |
| 24 | 0 | Cis-3-heptene. |
| 25 | 0 | Do. |
|  | 0 | Do. |

[1] Each fraction of effluent was about 15 cc. in volume.

As can be seen from Table I above, the trans and cis geometric isomers are separable by a two step elution or desorption operation using a desorbent containing varying quantities of a polar material or a hydrocarbon containing one or more functional groups. In this experiment, an essentially pure polar desorbent material was required to desorb the more tenaciously held cis-3-heptene from the silver-exchanged type Y crystalline aluminosilicate adsorbent.

Example II

In this example, a mixed linear heptene feed stream was used to illustrate the separation ability of the adsorbent for the various heptene isomers. The feed mixture composition is shown in Table II below.

TABLE II

| Isomer: | Weight percent |
|---|---|
| 1-heptene | 19.9 |
| Trans-2-heptene | 20.0 |
| Cis-2-heptene | 20.0 |
| Trans-3-heptene | 16.3 |
| Cis-3-heptene | 23.6 |
|  | 100.0 |

The procedures followed were similar to those used in Example I except that the effluent material was collected in 20 cc. volume fractions instead of the 15 cc. volume fractions used in Example I. Table III below shows the separate elution effects for trans and cis isomer separation.

TABLE III

| Effluent Fraction No.[1] | Pentane/ether | Weight of isomer in each fraction, mg. | | | | |
|---|---|---|---|---|---|---|
|  |  | 1-$C_7^=$ | t-2-$C_7^=$ | c-2-$C_7^=$ | t-3-$C_7^=$ | c-3-$C_7^=$ |
| 2 | 100/0 | 0 | 0 | 0 | 0 | 0 |
| 3 | 100/0 | 0 | 0 | 0 | 0 | 0 |
| 4 | 100/0 | 0 | 0 | 0 | 0 | 0 |
| 5 | 99.7/0.3 | 0 | 0 | 0 | 0 | 0 |
| 6 | 87.5/12.5 | 0 | 52.9 | 0 | 5.5 | 0 |
| 7 | 77.1/22.9 | 4.7 | 33.8 | 7.2 | 35.7 | 0 |
| 8 | 69.1/30.9 | 20.8 | 0 | 23.1 | 16.2 | 0 |

TABLE III—Continued

| Effluent Fraction No.[1] | Pentane/ether | Weight of isomer in each fraction, mg. | | | | |
|---|---|---|---|---|---|---|
| | | 1-C₇⁼ | t-2-C₇⁼ | c-2-C₇⁼ | t-3-C₇⁼ | c-3-C₇⁼ |
| 9 | 59.5/40.5 | 20.8 | 0 | 27.4 | 1.8 | 0 |
| 10 | 48.4/51.6 | 17.5 | 0 | 20.0 | 0 | 0 |
| 11 | 38.1/61.9 | 7.8 | 0 | 5.3 | 0 | 0 |
| 12 | 29.6/70.4 | 1.8 | 0 | 0 | 0 | 3.9 |
| 13 | 21.2/78.8 | 1.9 | 1.6 | 0 | 0 | 15.0 |
| 14 | 7.8/92.2 | 3.2 | 0 | 0 | 0 | 26.7 |
| 15 | 0.4/99.6 | 0 | 2.3 | 0 | 0 | 21.7 |
| 16 | 0.3/99.7 | 0 | 1.7 | 0 | 0 | 17.4 |
| 17 | 0.3/99.7 | 0 | 1.5 | 0 | 0 | 10.0 |
| 18 | 0.3/99.7 | 0 | 4.2 | 0 | 0 | 11.8 |
| 19 | 0.3/99.7 | 0 | 0 | 0 | 0 | 4.3 |
| 20 | 0.3/99.7 | 0 | 0 | 0 | 0 | 0 |
| 21 | 0.3/99.7 | 0 | 0 | 0 | 0 | 0 |
| 22 | 0.3/99.7 | 0 | 0 | 0 | 0 | 0 |
| 23 | 0.3/99.7 | 0 | 0 | 0 | 0 | 0 |

[1] Each fraction of effluent was about 20 cc. in volume.

As can be seen from Table III, the effluent removed and analyzed for fractions 1 through 7 contained primarily trans type material while the majority of the effluent material eluted from fractions 8 through 20 contained the cis configuration heptenes.

PREFERRED EMBODIMENTS

A broad embodiment of this invention resides in a process for the separation of cis and trans geometric isomers from a feed stream containing cis and trans geometric isomers by contacting said feed stream with an adsorbent and adsorbing the cis isomer within the adsorbent and withdrawing a feed stream depleted in the cis isomer. Another broad embodiment of this invention resides in a process which separates cis and trans geometric isomers from a feed mixture containing said geometric isomers by adsorption of said isomers on an adsorbent, withdrawing a feed stream relatively depleted in both geometric isomers, and separately desorbing the individual trans and cis geometric isomers.

We claim as our invention:

1. A process for classifying cis and trans olefinic hydrocarbons according to geometric configuration which comprises the steps of:

(a) contacting a feed mixture of cis and trans geometric isomers of said olefinic hydrocarbons at adsorption conditions with a crystalline aluminosilicate zeolite adsorbent containing at least one cation selected from the group consisting of the Group I–B and II–B metals and characterized by rigid three-dimensional networks and uniform pores having a diameter in the range of about 6 to about 15 angstroms to effect adsorption of said cis and trans isomers within the adsorbent;

(b) contacting the adsorbent from step (a) with a first relatively non-polar desorbent material to effect desorption of the trans isomer from the adsorbent; and, (c) contacting the adsorbent from step (b) with a second more polar desorbent material to effect desorption of the cis isomer from the adsorbent.

2. The process of claim 1 further characterized in that said olefinic hydrocarbons contain from 6 to 18 carbon atoms.

3. The process of claim 1 further characterized in that said adsorbent is type X zeolite.

4. The process of claim 3 further characterized in that said zeolite contains silver cations.

5. The process of claim 1 further characterized in that said adsorbent is type Y zeolite.

6. The process of claim 5 further characterized in that said zeolite contains silver cations.

References Cited

UNITED STATES PATENTS

| 2,850,549 | 9/1958 | Ray | 260—677 |
| 2,971,993 | 2/1961 | Kimberlin et al. | 260—676 |
| 3,248,322 | 4/1966 | Asher | 208—310 |
| 3,355,509 | 11/1967 | Carter et al. | 260—677 |
| 2,866,835 | 12/1958 | Kimberlin et al. | 260—676 |

HERBERT LEVINE, Primary Examiner

U.S. Cl. X.R.

208—310